(12) United States Patent
Boyden et al.

(10) Patent No.: US 8,640,909 B2
(45) Date of Patent: *Feb. 4, 2014

(54) FOOD PAN HAVING ELASTOMERIC HEAT AND SCRATCH RESISTANT PROTECTIVE FLANGE GASKET

(75) Inventors: Marc S. Boyden, Salt Lake City, UT (US); John H. Matsen, Farmington, UT (US)

(73) Assignee: Wasatch Manufacturing, LLC, Salt Lake City, UT (US)

( * ) Notice: Subject to any disclaimer, the term of this patent is extended or adjusted under 35 U.S.C. 154(b) by 224 days.

This patent is subject to a terminal disclaimer.

(21) Appl. No.: 13/084,468

(22) Filed: Apr. 11, 2011

(65) Prior Publication Data

US 2011/0186584 A1 Aug. 4, 2011

Related U.S. Application Data

(63) Continuation of application No. 11/853,614, filed on Sep. 11, 2007, now Pat. No. 7,922,027.

(51) Int. Cl.
*A47J 36/00* (2006.01)
(52) U.S. Cl.
CPC ....................................... *A47J 36/00* (2013.01)
USPC ....................................... 220/573.2; 220/756
(58) Field of Classification Search
CPC .................................. A47J 37/10; A47J 36/00
USPC ........... 220/573.2, 573.1, 912, 756, 755, 753, 220/752, 769, 770, 771, 659, 657, 656, 655, 220/643, 642, 641, 640, 768, 694, 654, 220/639; 16/430, 110.1, 431; 99/339, 448, 99/449, 483; D7/543, 393; D9/428, 425, D9/432, 431, 430, 424, 414
IPC ................... B65D 1/26, 1/22, 1/00; A47J 36/00
See application file for complete search history.

(56) References Cited

U.S. PATENT DOCUMENTS 1,282,862 A 10/1918 Knox
1,505,703 A 8/1924 Darley
(Continued)

FOREIGN PATENT DOCUMENTS

| DE | 4234088 | 4/1994 |
|----|---------|--------|
| JP | 2001-029225 | 2/2001 |
| JP | 2000-116509 | 4/2009 |

OTHER PUBLICATIONS

Anolon Nonstick Roasting Pan with Rack—Cooking.com http://www.cooking.com/products/shprodde.asp?SKU=548120&ref=http%3A%2F%Fwww%2Eolivergoodstuff%2Ecom%2Fcooking%2Ecom%2Fcookware%2Droasting%2520pans%Ehtml (Aug. 9, 2007).

(Continued)

*Primary Examiner* — Robert J Hicks
(74) *Attorney, Agent, or Firm* — Workman Nydegger

(57) ABSTRACT

Food serving pans made from heat conductive materials include a gasket positioned over a flange to protect fingers from heat or cold, improve gripping ability, seal against countertops of food serving tables, and/or protect paint or non stick coating from chipping off the flange. The food pan is made from aluminum or other highly heat conductive material. The gasket comprises silicone or other heat resistant and insulating elastomer. A food serving system includes one or more food pans and a food serving table. The food pans maintain food at a desired temperature by efficiently transferring heat or cold from the serving table while the gasket seals against a countertop of the serving table. The gasket can be provided in a kit of differently sized and/or shaped gaskets so as to fit over differently sized and/or shaped pan flanges. A user can install and replace the gasket as needed.

24 Claims, 10 Drawing Sheets

(56) References Cited

U.S. PATENT DOCUMENTS

| | | |
|---|---|---|
| 1,685,116 A | 9/1928 | Barchoff |
| 2,677,947 A | 5/1954 | Guilder |
| 2,771,754 A | 11/1956 | Winkler |
| 3,078,006 A | 2/1963 | Price et al. |
| 3,782,976 A | 1/1974 | Maier et al. |
| D246,342 S | 11/1977 | Yonkers |
| 4,653,469 A | 3/1987 | Miyaji et al. |
| 5,411,014 A | 5/1995 | Paul |
| 5,467,697 A | 11/1995 | Hunziker |
| 5,819,640 A | 10/1998 | Cuomo et al. |
| 5,934,472 A | 8/1999 | Ramirez et al. |
| 6,398,060 B1 | 6/2002 | Apostolides |
| 6,830,769 B2 | 12/2004 | Meroni |
| 2001/0019060 A1 | 9/2001 | Zank |
| 2003/0015540 A1 | 1/2003 | Liu |

OTHER PUBLICATIONS

Anodizing—Wikipedia, the free encyclopedia, "Dyeing" http://en.wikipedia.org/wiki/Anodizing#Dyeing (Aug. 9, 2007).

U.S. Appl. No. 11/853,614, filed Sep. 11, 2007, Office Action dated Mar. 10, 2010.

U.S. Appl. No. 11/853,614, filed Sep. 11, 2007, Office Action dated Jun. 29, 2010.

U.S. Appl. No. 11/853,614, filed Sep. 11, 2007, Notice of Allowance dated Dec. 17, 2010.

FOOD PAN HAVING ELASTOMERIC HEAT AND SCRATCH RESISTANT PROTECTIVE FLANGE GASKET

CROSS-REFERENCE TO RELATED APPLICATIONS

The present application is a continuation of copending U.S. patent application Ser. No. 11/853,614, filed Sep. 11, 2007, and entitled "FOOD PAN HAVING ELASTOMERIC HEAT AND SCRATCH RESISTANT PROTECTIVE FLANGE GASKET", the disclosure of which is incorporated herein in its entirety.

BACKGROUND OF THE INVENTION

1. The Field of the Invention

The present invention is in the field of cook and serving ware, more particularly food pans made of high heat conducting metal and which are used to heat or chill food contained therein.

2. The Relevant Technology

Buffet style dining has become very popular due to the variety and/or quantity of food that is made available to the customer. Customarily, various food items are placed into individual serving pans and then placed within correspondingly shaped and sized wells of stationary or mobile tables. The food is kept at appropriately hot, warm or cold temperatures depending on the type of food item. Failure to maintain the food at the appropriate temperature may result in spoilage or loss of customer appeal. In many cases, the serving tables themselves are equipped with heating or cooling units that input heat or cold from the serving table to the serving pots or platters. In this way, a food item can remain in a serving pan for an extended period of time while remaining at the appropriate temperature. Preventing spoilage and maintaining customer appeal reduces food waste, which increases profits to the owner and reduces the price to the customer. Moreover, state or local health codes may require discarding of food that has not spoiled nonetheless if the food is not maintained above or below a prescribed temperature.

Serving pans have been made from ceramics, metals and polymers. Ceramics and some metals such as cast iron are often preferred for their homey appearance ("looks just how grandma used to serve it"). One down side of large pans made from ceramics and used in buffet style dining places is that they are relatively thick and heavy, making it awkward and difficult to rapidly carry them to and from the serving table. Another down side is their tendency to insulate food from the surrounding environment. While such insulation properties might be beneficial at home to help keep food appropriately hot or cold while it is being served to the family, in the context of buffet style dining places highly insulating pans may detrimentally inhibit the transfer of heat or cold from the serving table. The result may be wasted energy, or worse, delayed heating or cooling, possibly resulting in spoilage or loss of customer appeal.

Serving pans have also been made of plastic. An advantage of plastic pans is they are generally much thinner and lighter than similarly sized ceramic and cast iron pans. One disadvantage is that plastic is typically an even better insulator from heat or cold than ceramic and cast iron, thus inhibiting the transfer of heat or cold from the serving table to the food item within the pan. Another disadvantage is that plastic can have a "cheap" appearance and can become discolored or hazed over time, thus reducing customer appeal. Yet another disadvantage is the propensity of plastic to become stained with food (e.g., white plastic can develop reddish blotches when exposed to tomato-based sauces). Anything that becomes visually unappealing to the customer can consciously or subconsciously reduce interest in a particular food item or even in the entire eating establishment.

Serving pans made from high heat transfer materials have been used, such as stainless steel and aluminum. One advantage of materials such as stainless steel and aluminum is their high strength, which allows them to be substantially thinner walled and therefore lighter weight than similarly sized cast iron and ceramic pans. Another advantage of pans made from high heat transfer materials generally is their ability to maximize heat and cold transfer from the serving table to the food item. Of course, this aspect is also a disadvantage as materials that rapidly conduct heat tend to feel hotter to the touch and can more rapidly burn a restaurant worker than more insulating materials, thereby requiring the use of hot pads or gloves when none might otherwise be required, or thicker hot pads or gloves where thinner, less bulky ones might have otherwise sufficed. Stainless steel and aluminum pans might also convey a high tech, industrial look due to their silvery hue. In the context of buffet-style dining, however, such look is often disfavored as being insufficiently "homey". As discussed above relative to plastic pans, anything that is visually unappealing to the customer can consciously or subconsciously reduce customer interest.

BRIEF SUMMARY OF THE INVENTION

The present invention relates to pans used to serve food items, which are made from highly conductive metals or other materials in order to maximize the rate of transfer of heat or cold from an external source to a food item contained within the food pan. The pans have a body portion comprising side and bottom walls of a desired shape and depth and a flange which projects laterally from the upper end of the body portion, which enables the pan to be suspended within a serving table designed to apply heat or cold to the pan. At least partially encasing the flange is a protective insulating and heat-resistant gasket made of silicone, other elastomer, or other durable, heat resistant, and insulating material. The various functions of the protective gasket will be explained in more detail below.

A typical serving table that may be used to hold and display the inventive pans has a counter top with recesses corresponding to the size and shape of the main body portion of the pan and an interior portion that circulates heat or cold to the surface of the pan in order to maintain a food item contained therein at an appropriate temperature. The recess allows the main body portion of the pan to be inserted through the recess and into the interior portion of the serving table. The flange typically has a larger circumference than the recess in order to overlap the counter top and thereby act as a stop and seal. This causes the pan to be securely suspended in a fixed position relative to the counter top of the serving table, thereby allowing customers to dish out food therefrom without disrupting the pan and dumping food over the counter top and/or into the interior portion of the serving table.

The protective gasket over the flange serves various functions. First, it proves an insulating heat barrier over the flange, which greatly slows heat transfer through the flange. This permits hot steamy food items to be transported to and from a serving table in the pan while protecting the fingers of restaurant workers from heat. In many cases, no hot pads or gloves are necessary to prevent burns, or at least thinner protective gloves may be used. This greatly increases tactile feel, grip and control of the pan, thereby reducing the risk of dropping the pan by the restaurant worker.

Second, the protective gasket over the flange provides a better seal between the pan and the countertop of the serving table. Providing a better seal between the countertop and pan improves the retention of heat and cold within the interior portion of the serving table. It also helps prevent seepage of liquid materials under the flange and into the interior portion of the serving table, thereby increasing the cleanliness of the serving table. This reduces time and effort that must otherwise be spent in cleaning the interior of the serving table to maintain sanitary conditions.

The flange may be perpendicular to the side wall of the food pan or otherwise parallel to a plane defining the upper pan opening. Alternatively, at least a portion of the flange may be angled or curved in order to provide a finger gripping recess in a lower surface of the gasket. The recess substantially improves finger grip by providing an angled finger gripping surface. It also provides a sealing ridge near the outer edge of the rim, which substantially improves the seal between the flange and counter top of the serving table. The angled or curved flange can also provide a depression in an upper surface of the outer periphery of the flange. This depression can receive a portion of the protective gasket and provide a substantially flush interface between the protective gasket and uncovered portion of the flange. Providing a substantially flush interface between the protective cover and flange helps prevent inadvertent lifting or hooking of the gasket by a spoon, fork or other serving utensil during use. This helps prevent invasion of food or contaminants between the flange and protective gasket, thereby helping to maintain a more sterile food pan when used multiple times.

According to one embodiment, the metal pan may be coated with a material that provides greater visual appeal, such as a dark paint or non-stick coating material that causes the pan to more closely resemble a cast iron or ceramic pan. This improves the "homey" look and feel of the pan compared to metal pans having a silvery color. In addition, non-stick coating materials improve clean up of dirty pans following use. This increases cleanliness and reduces clean up costs.

In the case where the metal pans include a coating material, the protective gasket provides the additional benefit of protecting the coating material on the flange from chipping or wearing off. The main point of contact between the pan and the serving table is the flange. Metal on metal contact can cause the coating material to become worn or chipped in a short period of time. It can also dent or scratch a relatively soft metal such as aluminum. In addition, the exposed nature of the flange causes it to be impacted most often during cleaning, handling and storage apart from use in the serving table. This is especially true of the narrow outer edge of the flange, which can be subjected to high impacts through routine wear and tear. A chipped or worn flange can greatly detract from the visual appeal of the pan. People do not wish to ingest foreign materials, and a chipped or worn flange may give the impression that the pan is old, unclean or otherwise unsuitable for serving food, thereby greatly diminishing the restaurant's customer appeal. The protective gasket over the flange prevents chipping or wear of the underlying paint or non-stick coating on the metal pan, it can hide such chipping or wear if already present, and it can protect soft metals from blunt forces whether or not they are painted or coated. This enhances the visual appeal and longevity of a metal pan having a paint or non-stick coating that might otherwise have to be replaced due to a chipped or worn appearance.

The protective gasket over the flange is advantageously made from a durable, heat resistant and insulating material such as silicone or other elastomer, which maximizes its useful lifespan. It can have a color that exactly matches and blends with the paint or non-stick coating of the pan so that it is virtually unnoticeable. Alternatively, it can have one or more complementary and/or contrasting colors to provide decorative appeal. In the case of elastomer or other flexible materials, the protective gasket can provide shock resistance when the flange of the pan impacts metal or other hard objects, thereby increasing its useful lifespan. It may also facilitate replacement of an older protective gasket with a new one. Elastomeric protective gaskets provide greater finger gripping friction and a better seal between the flange and serving table countertop compared to harder and/or less resilient materials.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION OF THE PREFERRED EMBODIMENTS

The present invention relates to food pans made from highly conductive materials and which include a gasket that covers at least a portion of the pan flange. Such pans are designed to quickly and evenly distribute heat or cold throughout the food pan. The gasket is designed to provide some or all of the following attributes: (1) thermally insulating the flange to protect a person's fingers touching the flange; (2) providing a recess in the gasket to enhance finger gripping; (3) protecting paint or non stick coating from chipping or wearing off the flange; and (4) enhancing the seal between the flange and a counter top of a food serving table.

The food pans are advantageously sized and shaped so as to be insertable within the recesses of a counter top of a food serving table in order to be suitable for buffet-style dining. Food serving systems according to the invention may include a plurality of food pans in combination with a food serving table that is adapted to maintain the food pans at a desired temperature.

Figure 1:
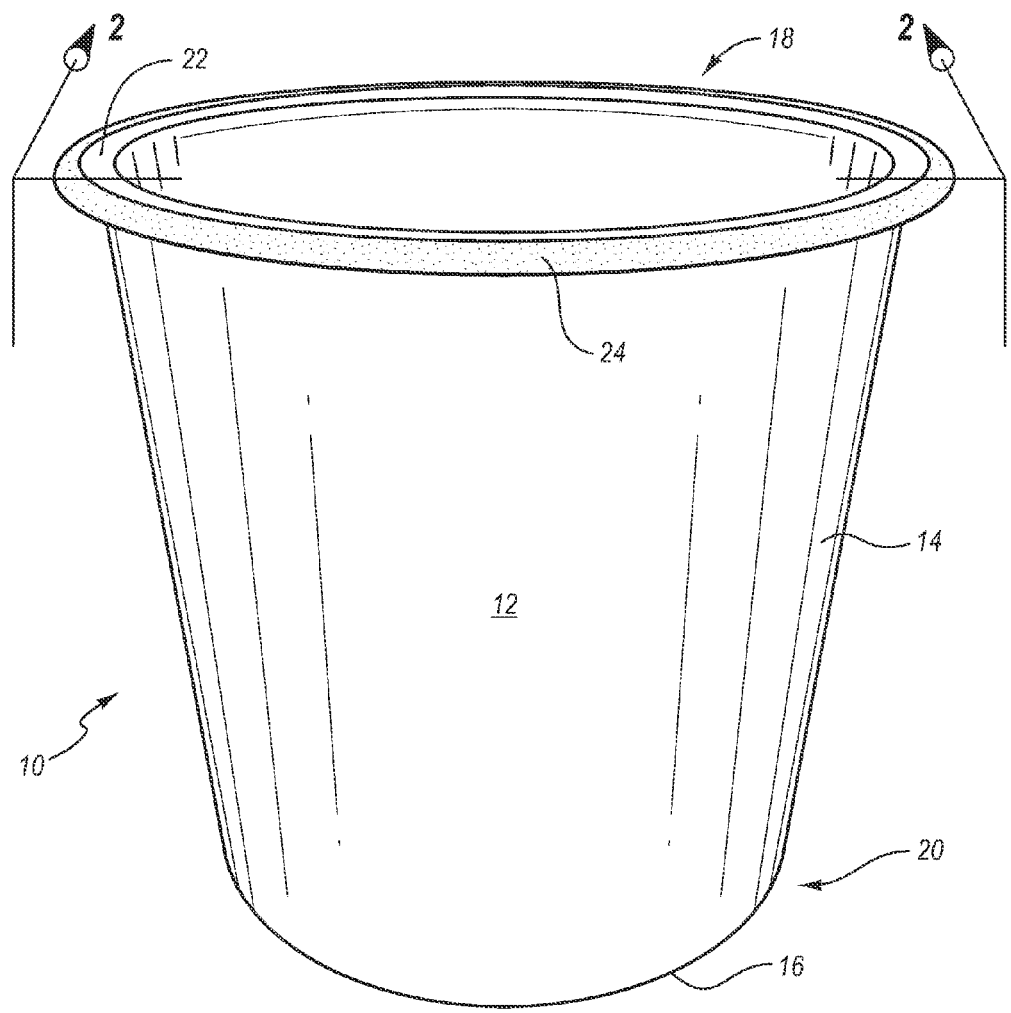
FIG. 1 is a perspective view of an exemplary circular food pan according to the invention having a protective gasket over the flange.
Figure 2:
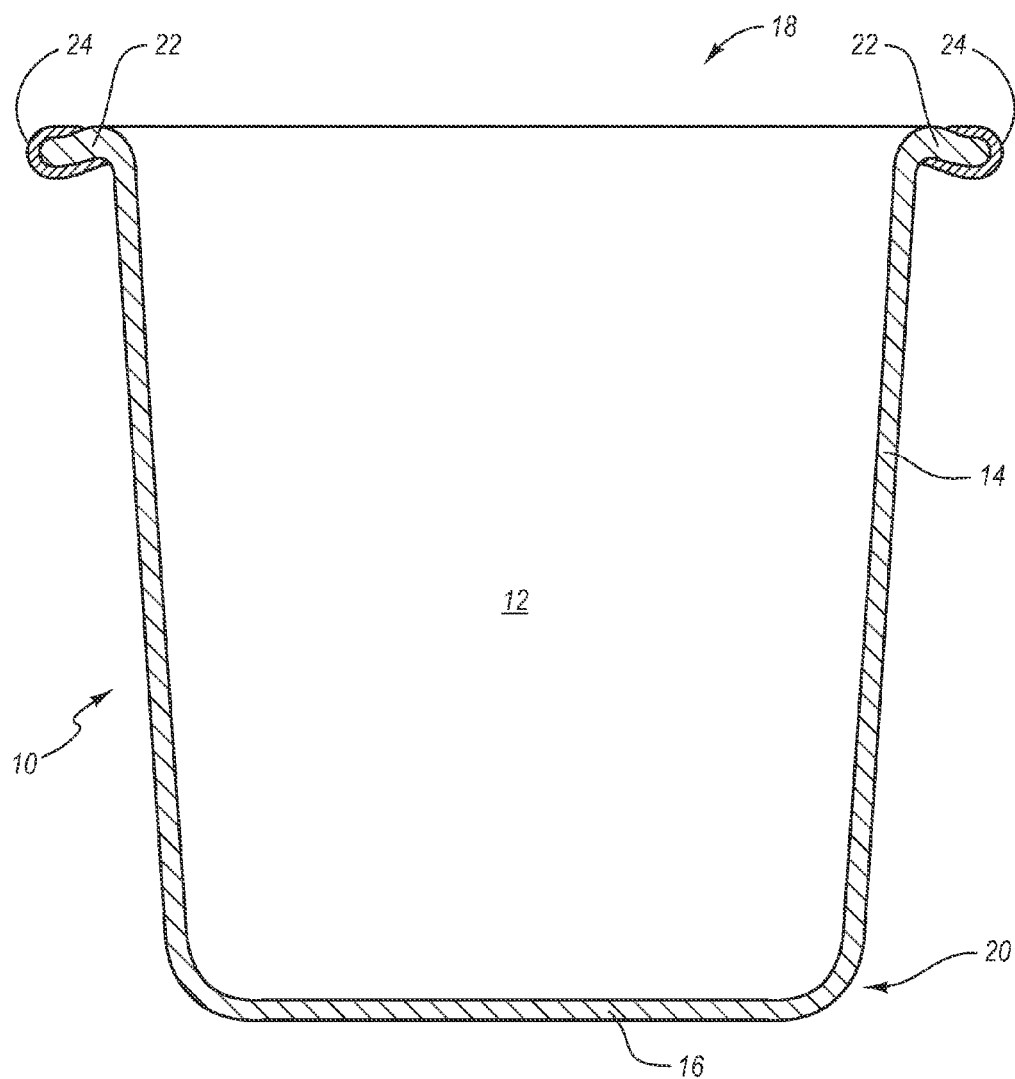
FIG. 2 is a cross-sectional view of the circular pan of FIG. 1.

Reference is now made to the drawings, which show exemplary food pans and food serving systems within the scope of the invention. FIGS. 1 and 2 illustrate an exemplary food pan 10 according to the invention having a generally circular cross section. It should be understood that the circular cross section is merely exemplary and that food pans according to the invention can have any desired cross sectional shape, height and width (e.g., FIG. 4A, which shows an oval food pan 400, and FIG. 4B, which shows a rectangular food pan 402). The food pan is a pan body 12 which, in this example, includes a generally vertical side wall 14 and a horizontal bottom wall 16. Together, the side wall 14 and bottom wall 16 define an open upper end 18 of pan body 12 and a closed lower end 20. The pan body 12 can be cylindrical so as to have constant diameter or it can be frustoconical so as to have varying diameter. Body 12 in this example is shown with a side wall 14 that tapers from a larger diameter at upper end 18 to a smaller diameter at lower end 20. This configuration facilitates insertion of pan body 12 through a recess of a serving table.

Pan 10 further includes a flange 22 that extends or projects laterally from the side wall 14 at or near the upper end 18 of pan body 12. The flange 22 serves several purposes. First, it provides a lateral gripping surface that permits a person to hold the pan 10 using the person's fingers (See FIG. 6). Second, by extending beyond the outer circumference of the pan body 12 the flange 22 can overlap the counter top of a serving table in order to securely suspend the pan 10 in a desired location during use (See FIG. 8). Third, the flange 22 provides supporting structure for a gasket 24 and cooperates therewith to provide various functions as are discussed more fully below.

Figure 3:
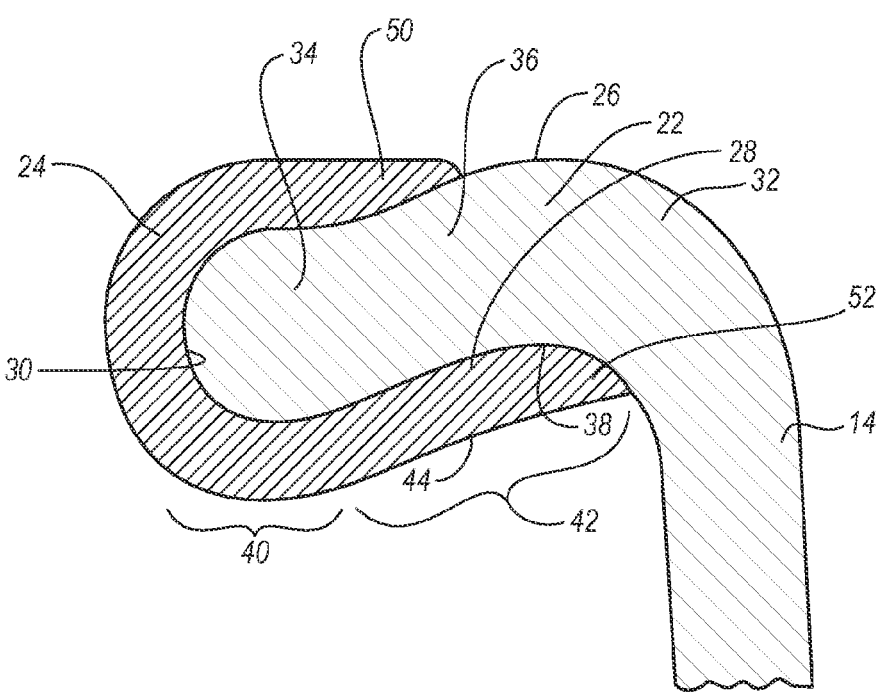
FIG. 3 is a close-up cross-sectional view of the flange of the food pan of FIG. 1 and the protective gasket.

Turning to FIG. 3, a close-up view of the flange 22 and gasket 24 is provided in order to show an exemplary flange/gasket configuration according to the invention. The flange is comprised of an upper surface 26, a lower surface 28, and an outer edge 30 that extends between upper surface 26 and lower surface 28. According to one embodiment, the outer edge 30 is advantageously convexly curved. Providing a curved outer edge 30 helps maintain more reliable contact between the flange 22 and gasket 24 and eliminates sharp edges or corners that might otherwise cause an elastomeric gasket 24 to bulge around the corners and become separated from the flange 22 at the interfaces between the outer edge 30 and the upper surface 26 and lower surface 28.

In general, it is advantageous for gasket 24 to remain immediately adjacent to flange 22, more particularly upper surface 26, lower surface 28, and outer edge 30, rather than maintaining a gap between the gasket 24 and flange 22. This reduces or eliminates flexing and slippage of the gasket 24 relative to the flange 22 and it helps prevent the invasion of food or contaminants between the gasket 24 and flange 22. Providing or permitting a substantial gap to remain between the gasket and flange (i.e., a gap width of 50% or more of the gasket thickness) significantly increases the tendency of the gasket to inadvertently slip off the flange during use (i.e., while carrying the pan during transport to and from the serving table, suspending the pan within the serving table, or washing the pan) and provides an enclosed location where food or contaminants (e.g., bacteria or mold) can collect over time. Therefore, it is desirable for the gasket 24 to either lie immediately adjacent to the upper and lower surfaces 26, 28 of flange 22 or else maintain a gap width that is less than about 20% of the gasket thickness, preferably less than about 15% of the gasket thickness, more preferably less than about 10% of the gasket thickness, and most preferably less than about 5% of the gasket thickness.

Flange 22 further includes an inner region 32 adjacent to the side wall 14 of pan body 12 and an outer region 34 extending from the inner region 32 to the outer edge 30. The outer region 34 of the flange 22 in this example is elevationally offset relative to the inner region by an angled transition section 36. This provides a concavity 38 in the lower surface 28 of the flange 22, generally within the inner region 32. The gasket 24 in this example extends over and covers essentially all of the lower surface 28 of the flange 22, including the concavity 38. In general, the gasket will cover more than about 70% of the lower surface 28 of the flange 22, preferably more than about 80%, more preferably more than about 90%, and most preferably essentially all of the lower surface 28 of flange 22.

Except for the upper and lower ends, the gasket 24 in this example has a generally continuous thickness. As such, by following the contours of the lower surface 28 of flange 22, the combination of the contoured flange 22 and gasket 24 comprises means for providing a circumferential sealing ridge 40 on a lower surface of the gasket 24 and means for providing a finger gripping recess 42 in the lower surface, which is disposed between the circumferential sealing ridge 40 and side wall 14 of pan body 12. However, the lower surface of the gasket 24 should not provide interior corners (e.g., 90° or less) where food or debris can collect.

The recess 42 provides an angled finger-engaging surface 44 (i.e., relative to a plane defined by the pan opening) that facilitates more secure finger engagement of the gasket/flange assembly compared to a non-angled gasket. The angled finger-engaging surface 44 advantageously has a downwardly sloping angle, in a direction toward the outer edge 30 of flange 22, that is greater than 0° and less than 90° relative to the plane defined by the pan opening, preferably greater than about 5° and less than about 75°, more preferably greater than about 10° and less than about 60°, and most preferably greater than about 15° and less than about 50° relative to the plane defined by the pan opening. The angled finger-engaging surface 44 advantageously provides a contact surface that is sufficiently wide so as to provide contact between a person's finger tips and the angled finger-engaging surface 44.

In the gasket/flange assembly shown in FIG. 3, an upper portion of the gasket 24 extends over and covers the upper surface 26 of the flange 22 in the outer region 34 but not the inner region 32. The gasket 24 further includes a beveled end 50 having an angle that corresponds to the angled transition section 36 in order for an upper surface of gasket 24 to lie substantially flush with the unexposed upper surface 26 in the inner region 32 of flange 22. The substantially continuous elevation at the interface between the gasket 24 and flange 22 reduces or prevents inadvertent lifting or hooking of the gasket by a spoon, fork or other serving utensil during use. This feature helps prevent invasion of food or contaminating debris between the gasket 24 and flange. That, in turn, helps maintain the cleanliness and sterility of the food pan 10 when used multiple times to serve food. A second beveled end 52 is provided to create a more uniform transition between a lower side the gasket 24 and a curvature at the interface of the lower surface 28 of flange 22 and the side wall 14 of pan body 12. This also helps prevent invasion of food or contamination between the gasket 24 and flange 22.

Figure 3A:
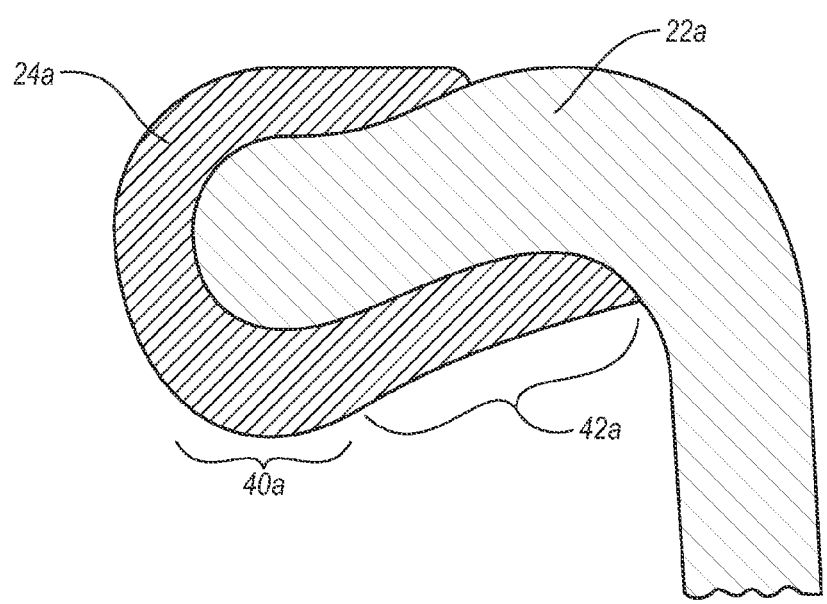
FIG. 3A is a close-up cross-sectional view of an alternative flange and protective gasket design.

FIG. 3A illustrates an alternative embodiment of a gasket/flange assembly in which the gasket 24a has a thicker cross-sectional thickness in the region of the circumferential sealing ridge 40a and a thinner cross-section thickness in the region of the finger gripping recess 42a. In this way, the gasket 24a itself, rather than the contours of the flange 22a, comprises means for providing the circumferential sealing ridge 40a on the lower surface of the gasket 24a and means for providing the finger gripping recess 42a in the lower surface between the circumferential sealing ridge 40a and side wall 14 of pan body 12. In general, the means for providing a circumferential sealing ridge and finger gripping recess may comprise a contoured flange 22 in combination with a gasket 24 of uniform cross-sectional thickness, a non contoured (i.e., planar flange, not shown) in combination with a gasket having non uniform cross-sectional thickness, and combinations thereof (e.g., as illustrated in FIG. 3A).

The height and width of the circumferential sealing ridge should be selected to provide contact between the circumferential sealing ridge and a counter top surface of a food serving table but not the finger gripping recess. By concentrating the weight of the food pan on the circumferential sealing ridge, a better seal is provided. In the event the circumferential sealing ridge is provided mostly or entirely by a flexible elastomeric gasket having non uniform cross-sectional thickness, the height of the circumferential sealing ridge should not exceed its width by an amount that would cause substantially lateral deflection or bending of the ridge during use (e.g., when weighted down with food), which could compromise the seal and/or the structural integrity of the gasket, particularly when laterally deflected and exposed to heat over time. For example, in case of flexible materials such as silicone rubber, the height should be less than twice the width, preferably less than about 175% of the width, more preferably less than about 150% of the width, and most preferably less than about 125% the width.

Figure 4A:
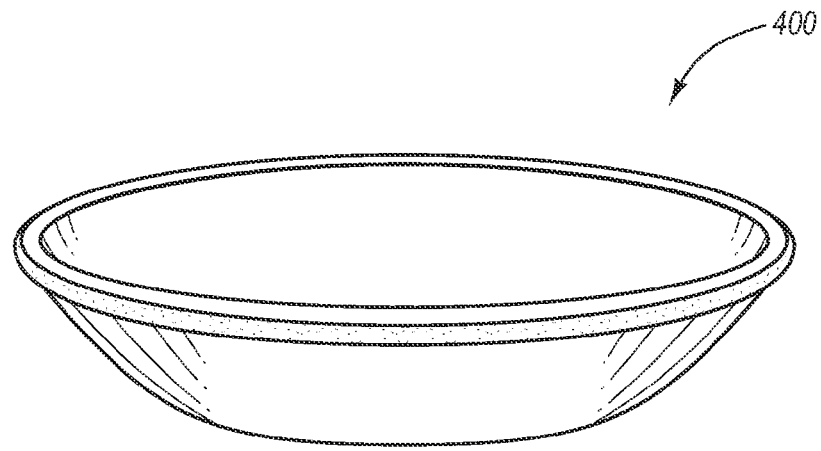
FIG. 4A is a perspective view of an exemplary oval food pan according to the invention having a protective gasket over the flange.
Figure 4B:
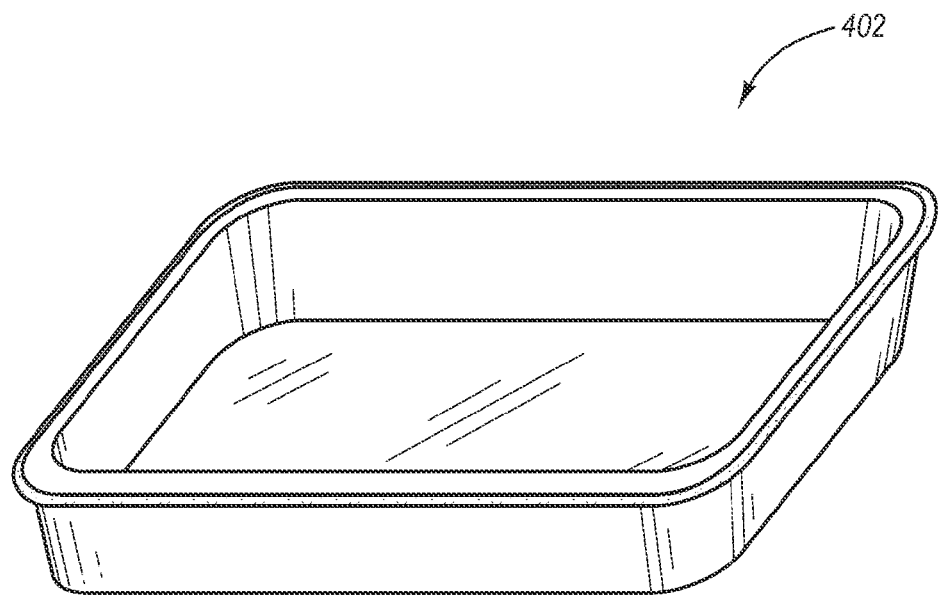
FIG. 4B is a perspective view of an exemplary rectangular food pan according to the invention having a protective gasket over the flange.

FIGS. 4A and 4B show alternative food pans according to the invention having a cross-sectional shape that is not circular. FIG. 4A illustrates an exemplary food pan 400 having a generally oval cross section. FIG. 4B illustrates an exemplary food pan 402 having a generally rectangular cross section, although the corners are advantageously rounded rather than being sharp to facilitate cleaning and functionality (e.g., insertion into a corresponding recess of a food serving table).

Figure 5:
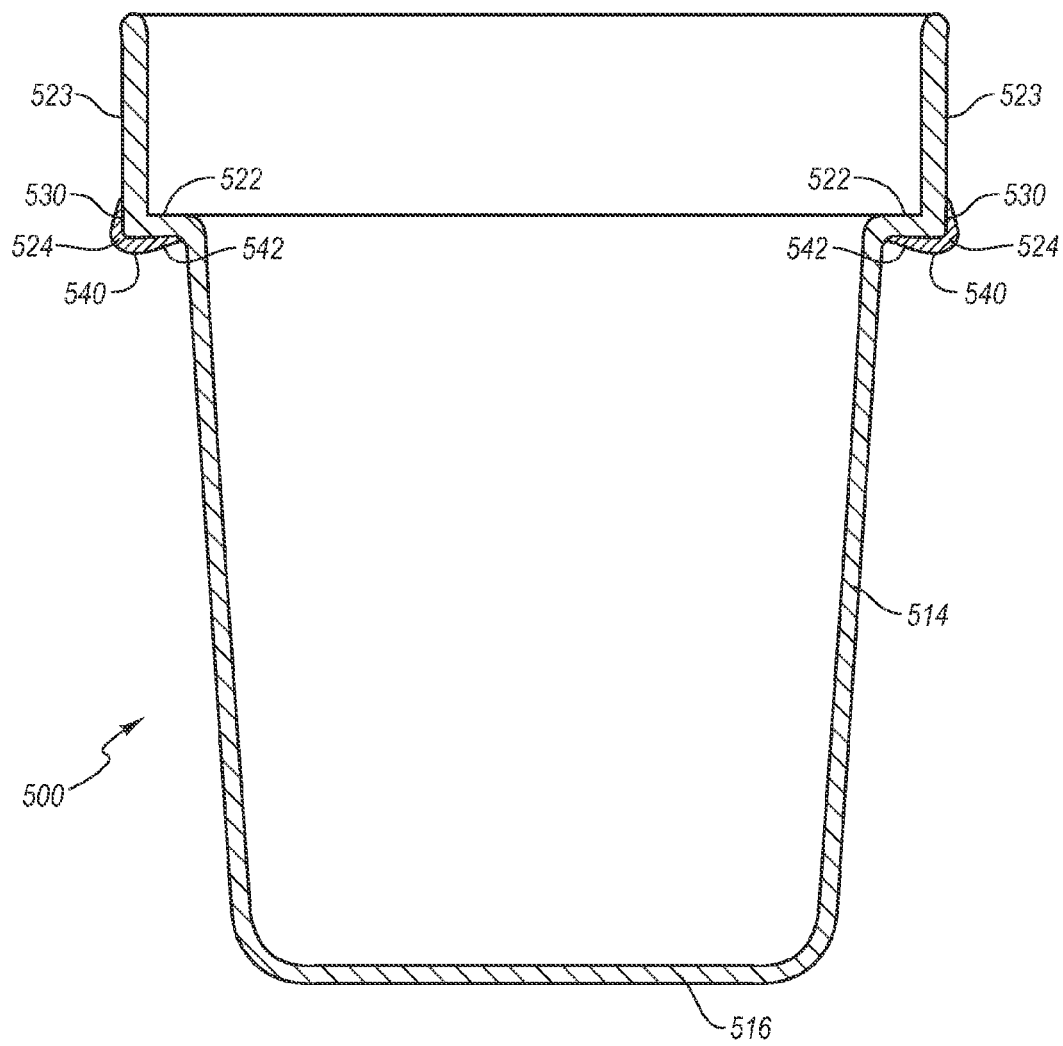
FIG. 5 is a cross-sectional view of an exemplary food pan according to the invention having an extension wall extending above the flange to increase capacity.

FIG. 5 illustrates an exemplary food pan 500 according to the invention having a generally vertical lower side wall 514, a horizontal bottom wall 516, a flange 522 extending or projecting laterally from side wall 514, and an upper side wall extension 523 that extends or projects generally vertically relative to flange 522. The upper side wall extension 523 provides increased vertical capacity of food pan 500 above the flange 522. Because lower side wall 514, bottom wall 516, flange 522, and upper side wall extension 523 are composed of a high heat transfer or conducting material (e.g., aluminum, stainless steel or heat conductive ceramic), heat or cold can readily flow from lower side wall 514 to upper side wall extension 523, where it can be transferred to food positioned within the volume enclosed by upper side wall extension 523.

Food pan 500 further includes a heat resistant and insulating gasket 524, which is disposed adjacent to a lower surface of flange 522, which wraps around an outer edge or corner 530 of the flange. The gasket 524 further includes a circumferential sealing ridge 540 on a lower surface of gasket 524 and a finger gripping recess 542 in the lower surface between the circumferential sealing ridge 540 and lower side wall 514 of food pan 500. The circumferential sealing ridge 540 and finger gripping recess 542 provide essentially the same functions discussed above relative to food pan 500 and gasket 524 (i.e., in order to help form a seal between flange 522 and a food serving table and also to provide an angled finger-engaging surface). The gasket 524 also protects outer edge or corner 530 from chipping or indentation and/or removal of paint or non stick coating thereon.

A portion of gasket 524 may also extend along a portion of an outer surface of upper side wall extension 523 in order to provide more secure engagement with food pan 500. Alternatively, in the event upper side wall extension 523 extends from flange 522 at a location other than at or near outer edge or corner 530 (e.g., midway between the outer edge or corner 530 and lower side wall 514), the gasket 524 may extend over at least a portion of an upper surface of flange 522 (not shown).

Figure 6:
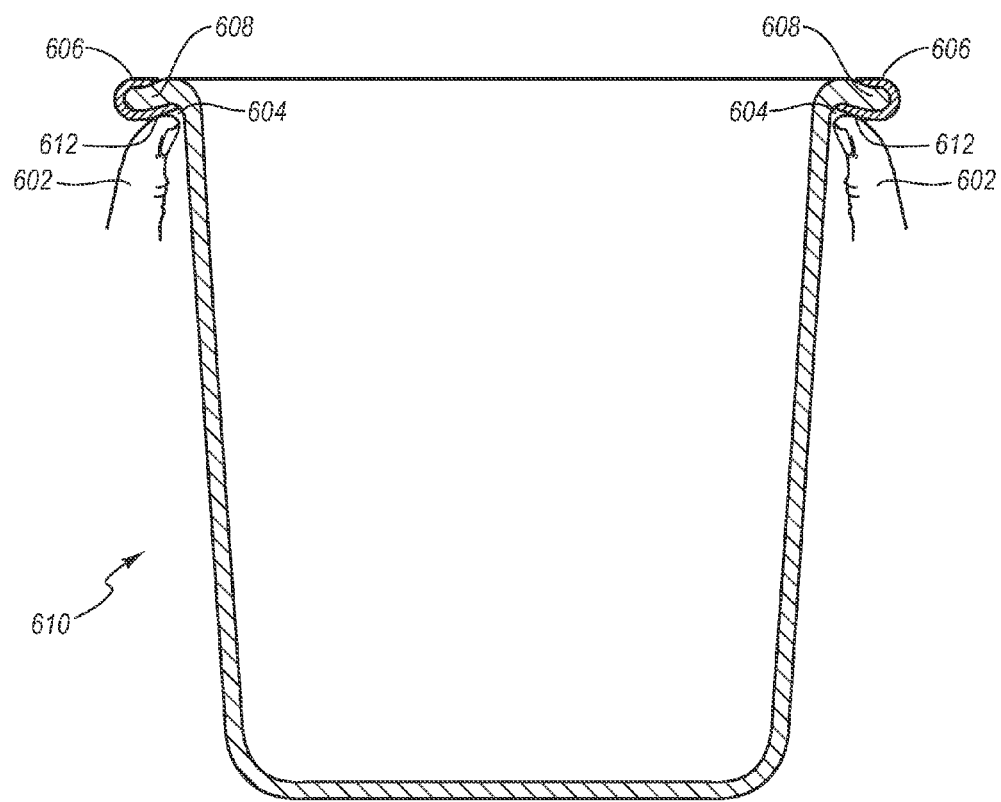
FIG. 6 is a perspective view of a food pan having a protective gasket over the flange in contact with a person's fingers.

FIG. 6 illustrates how a person's finger tips 602 engage the finger gripping recess 604 provided by the gasket 606 and flange 608 of pan 610. The angled finger engagement surface 612 of the finger gripping recess 604 provides substantially greater gripping control compared to a surface that is parallel to the plane defined by the outer opening of the pan. The angled finger engagement surface 612 overlaps the finger tip's 602 and thereby helps prevent lateral slippage of the gasket 606 and flange 608 assembly off of the person's finger tips 602 while carrying the pan 610 (e.g., when filled with food). On the other hand, the angle of the angled surface 612 is not so great as to pull the gasket 606 off the flange 608 (e.g., as might occur if the finger engagement surface 612 were oriented perpendicular, or 90°, relative to the plane defined by the outer opening of the pan). In addition to enhancing finger grip, the gasket 606 insulates the person's fingers from high heat or cold depending on the temperature of the food contained within the pan 610.

Figure 7:
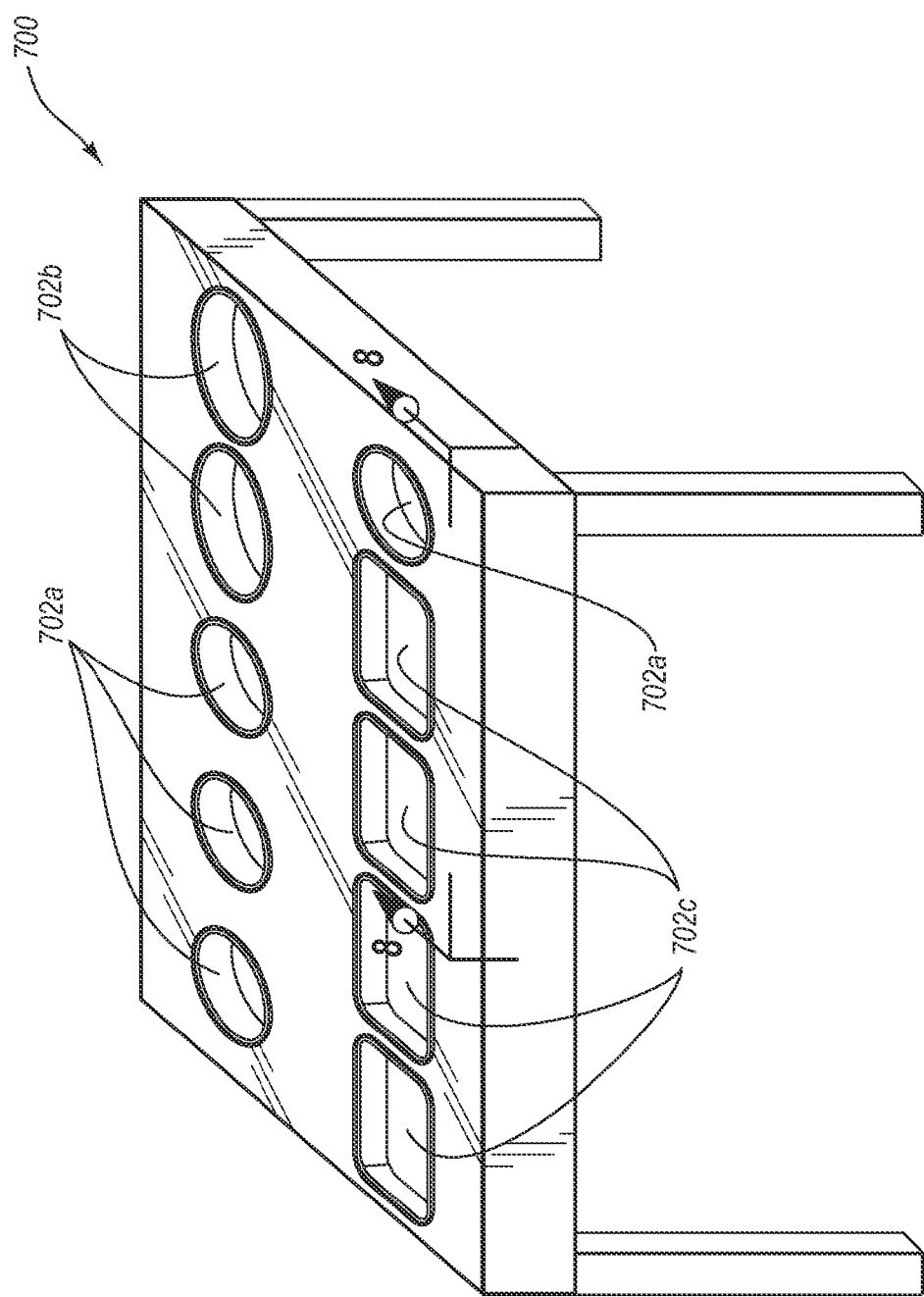
FIG. 7 is a perspective view of an exemplary serving table holding therein various sized and shaped food pans according to the invention.

FIG. 7 shows an exemplary serving table 700 holding therein various sized and shaped pans 702 according to the invention. In this example, the serving table 700 as illustrated includes a counter top 704 that is substantially planar. The counter top 704 includes a plurality of correspondingly sized and shaped recesses into which the pans 702 are inserted and from which they are suspended during use. By way of example, the recesses are sized and shaped so as to receive circular pans 702a, oval pans 702b, and rectangular pans 702c. Each pan 702 includes a flange 706 and associated gasket 708 (See FIG. 8) that overhangs the counter top 704. In this way, the pans 702 can be suspended within an interior of the serving table 700 in a desired spaced-apart orientation. In order to better circulate heat or cold air around the exterior surfaces of the pans 702, adjacent pans do not directly contact each other but include a space therebetween.

In order to maintain the pans 702 and food contained therein at a desired temperature, heating and/or cooling means are provided for exposing the pans to heat or cold. Exemplary heating means include, but are not limited to, one or more of a gas burner, (see FIG. 8, item 712) an electric heating element, a radiator containing circulating hot water, circulating hot water, and the like. Exemplary cooling means include, but are not limited to, a refrigeration unit (e.g., comprising a radiator, circulating coolant, and compressor), ice, circulating chilled water, and the like. A fan may be included if desired to circulate heated or cooled air around and between the pans 702. It will be appreciated that any heating or cooling devices known in the art for maintaining food at a desired temperature is an example of heating or cooling means for purposes of understanding the scope of the invention.

Figure 8:
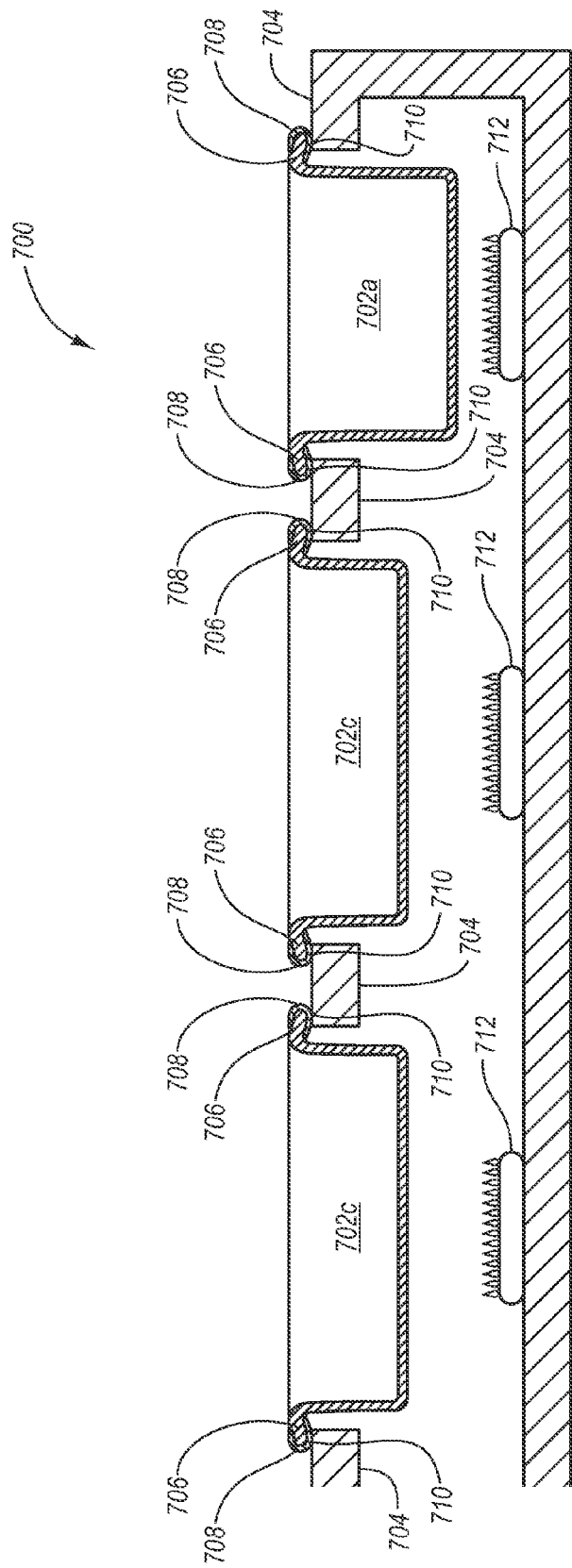
FIG. 8 is a cross-sectional view of the serving table and food pans of FIG. 7.

FIG. 8 is a cross sectional view of a portion of the serving table 700 of FIG. 7, including pans 702, counter top 704, flange 706 and associated gasket 708. FIG. 8 illustrates how the circumferential sealing ridge 710 on a bottom side of the gasket 708 seals against the generally planar surface of counter top 704. This seal helps to maintain heat or cold beneath the pans 702 during use. Preventing leakage of heat or cold substantially increases the efficiency with which the serving table 700 heats or cools the pans 702 and thereby maintains food contained therein at a desired temperature. This, in turn, helps prevent spoilage of food contained within the pans 702, particularly over prolonged periods of time, such as several hours, as may occur at buffet-style dining establishments. Preventing food spoilage represents a tremendous cost saving and prevents waste. Moreover, increasing the efficiency of heating or cooling also reduces the amount of energy and cost associated with operating the serving table 700. Furthermore, maintaining food above or below a prescribed minimum or maximum temperature may obviate the need to discard otherwise non spoiled food as a result of technical violations of state or local ordinances.

Figure 9:
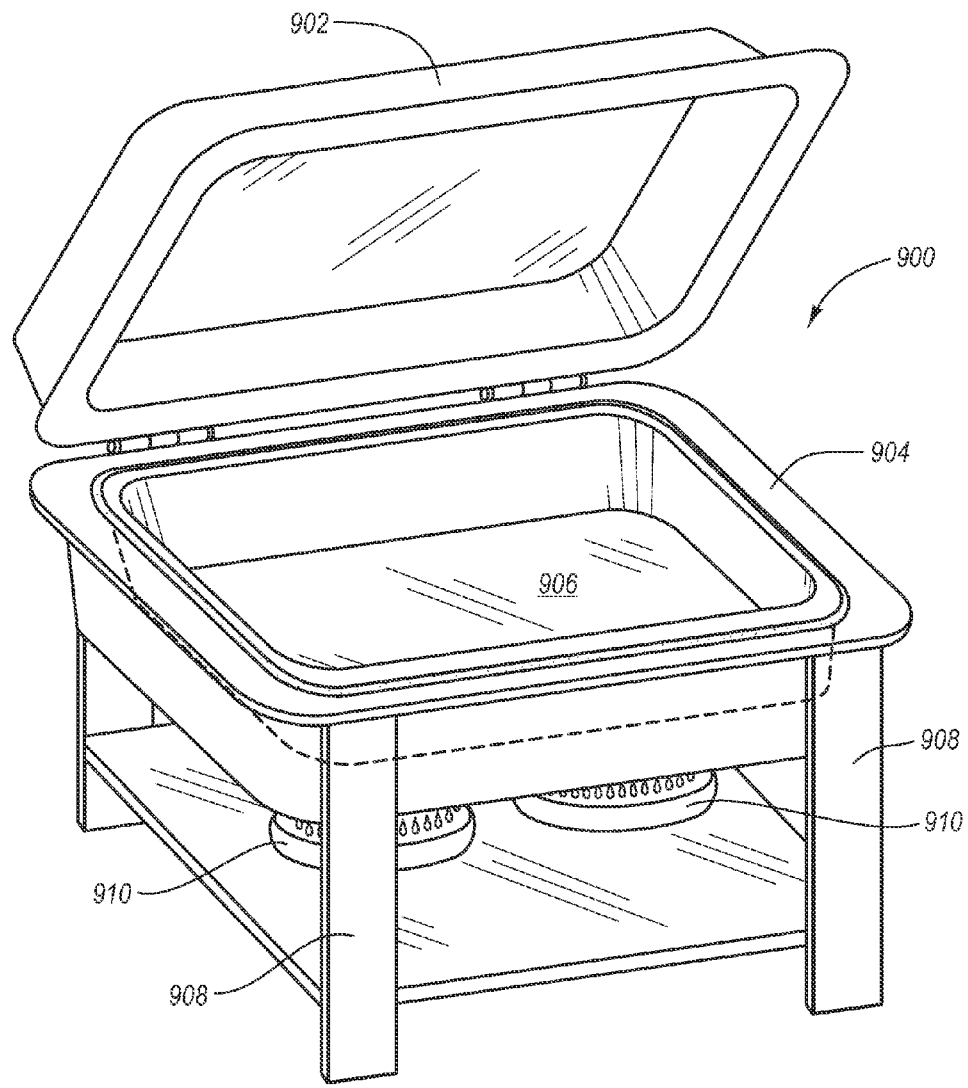
FIG. 9 is a perspective view of an exemplary chafing dish holding therein a food pan according to the invention.

FIG. 9 discloses an alternative embodiment of a food serving table, which comprises a chafing dish assembly 900. The chafing dish assembly 900 includes a hinged lid 902 that can be selectively opened and closed to access or protect food, an outer water pan 904, a food pan 906 according to the invention that fits and is suspended within the water pan 904, a frame 908, and heat source 910. The chafing dish assembly 900 may alternatively include cooling means, such as ice disposed within water pan 904, for cooing the food pan 906. The chafing dish assembly 900 may accommodate a single food pan 904 or multiple food pans as desired. It may include one water pan 904 or multiple water pans as desired.

Figure 10:
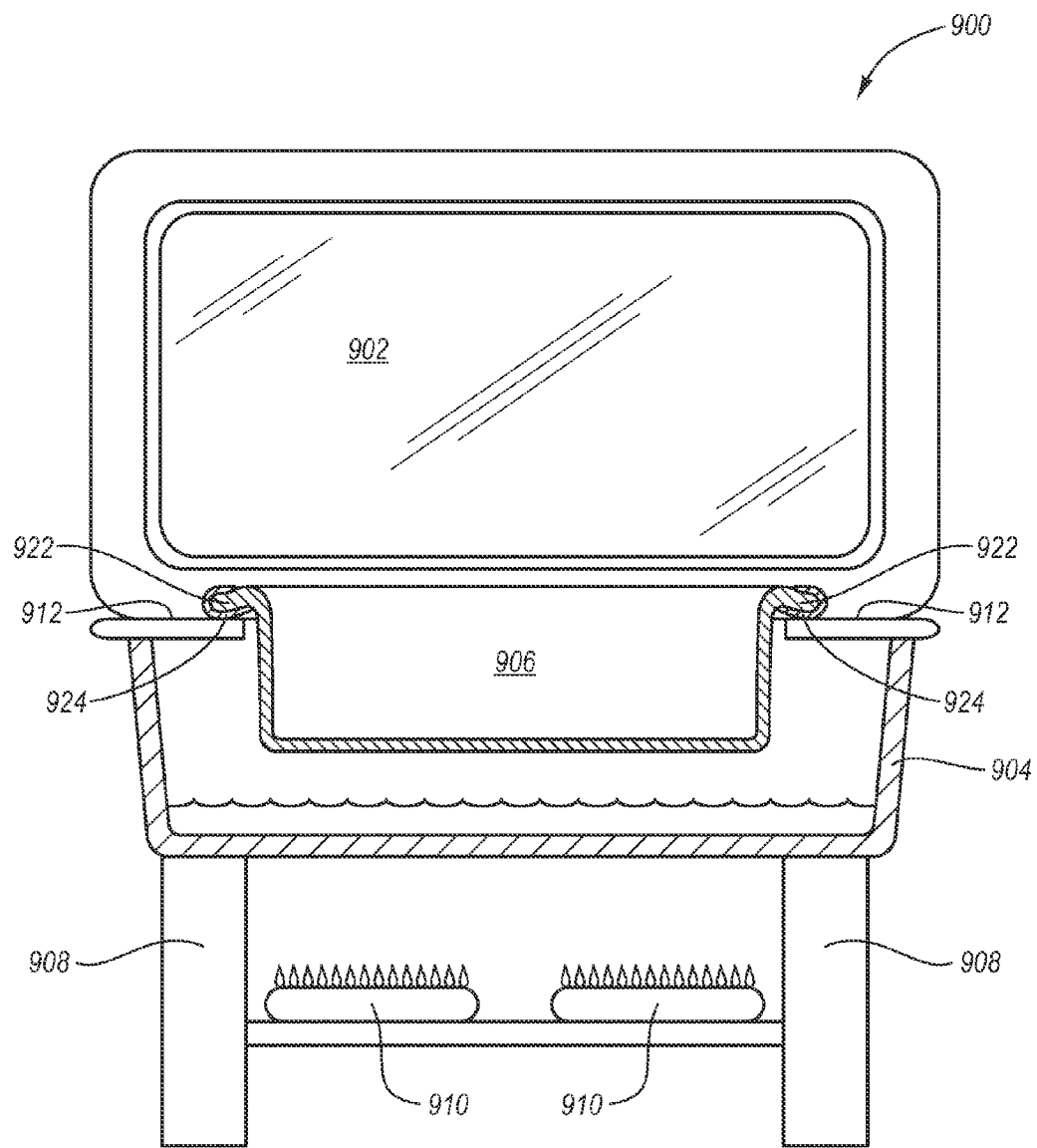
FIG. 10 is a cross-sectional view of the chafing dish and food pan of FIG. 9.

FIG. 10 is cross-sectional view of the chafing dish assembly 900, more particularly showing the engagement between the water pan 904 and food pan 906. The food pan 906 includes a flange 922, which overhangs an upper surface 912 of water pan 904 during use, and a gasket 924, which forms a seal between the flange 922 and upper surface 912 of water pan 904. The gasket 924 causes the chafing dish assembly 900 to more efficiently retain heat or cold during use. The gasket 924 also protects a user's fingers from heat or cold while carrying the food pan 906 to and from the water pan 904.

In order to further increase the efficiency of heat transfer from a food serving table to a pan positioned therein, the food pans are advantageously made from a high heat conductive material. Examples include aluminum, stainless steel, and highly conductive ceramics. An advantage of aluminum is its low density. Pans made from aluminum are much lighter weight compared to a stainless steel pan of comparable size and wall thickness. However, as compared to stainless steel, aluminum is more easily attacked by acidic or alkaline substances, which can cause pitting. The aluminum surface can be anodized.

In order to better protect an aluminum pan from attack and pitting, it is advantageous to provide a protective paint coating. Heat resistant paints known in the art can be used. Alternatively, it may be desirable to coat the aluminum pan with one or more layers of a non stick coating material. Examples of non stick coatings include tetrafluoroethylene (TEFLON), coatings made by cross-linking tetrafluoroethylene and other materials, coatings made from perfluorooctanoic acid and $C_8$ ammonium salts, other fluorinated polymers, silicone-ceramic composites, other silicone-based coatings, and layers of anodized metal. Examples of non stick coatings include Whitford Eclipse®, which imparts a darker color, and Whitford Xylan®, which imparts a lighter color. It will be appreciated that the paint or non stick coatings are advantageously selected to strongly adhere to the aluminum pan and to resist scratching, chipping or pealing. Such coatings can also be applied to pans made from other materials, such as stainless steel, ceramics, and cast iron.

Nevertheless, the position and function of the flange provides an area of high impact, which can cause chipping or wearing away of the paint or non stick coating off the flange. Impacts may be caused by contact between the flange and utensils used to serve food, contact between the flange and counter top of a serving table (e.g., when inserting and withdrawing the pan or movements of the pan while serving food), contact between the flange and a rigid sink or parts of a mechanical dishwasher during cleaning, or by accidentally tipping over the pan on a hard surface. Removal of paint or non stick coating can result in foreign material falling into food contained in the pan. It may also be unsightly, especially when the paint or non stick coating is a dark or other contrasting color relative to the silvery color of the underlying aluminum pan. Removal of paint or non stick coating from the flange can prematurely end the life of an otherwise good pan.

Examples of paint or non stick coating colors include, but are not limited to, metallic bronze, dark brown, black, or white. Virtually any other desired color of the rainbow can be selected by adding appropriate pigments. For warm foods, the paint or non stick coating might have a reddish tint, which is a warm color and suggestive of warmth. For cool foods, the paint or non stick coating might have a grey or bluish tint, which is a cool color and suggestive of refreshing coolness.

Several layers (e.g., three) of paint or non stick coating may be provided to increase durability. The term "paint" refers to both conventional paints applied as a liquid or gel and paints applied as a powder coating and melted or sintered over a substrate surface.

In the case where the pan includes paint or non stick coating, the gasket provides the added benefit of protecting the paint or non stick coating from chipping or otherwise wearing off the flange. The location where chipping is greatest is at the outer edge of the flange. Accordingly, the gasket will therefore entirely cover and protect at least the outer edge of the flange. The second most highly chipped region is the lower surface of the flange, where it contacts the counter top of a serving table. Covering most or all of the lower surface, or at least providing a circumferential sealing ridge that prevents contact of the flange and counter top substantially protects the paint or non stick coating from chipping or wearing off the lower surface of the flange.

The gasket is advantageously made from a heat resistant and insulating material. Heat resistance protects the gasket from stretching, deterioration or brittleness when exposed to fluctuating or extreme temperatures (i.e., high heat or freezing cold). The gasket advantageously maintains its desired properties of flexibility and resilience over a wide range of temperatures between extremes of heat and cold. Insulation protects a person's finger tips when contacting a gasket adjacent to a hot flange of a pan that contains hot food. It also helps to seal and maintain heat or cold beneath the countertop of a food serving table rather than leaking around or radiating through the flange while the pan sits within the serving table. Examples of materials from which the gasket can be made include heat resistant and insulating elastomeric materials.

Elastomers, such as silicone rubber, are especially well suited as gasket materials due to the their heat resistance, insulating ability, resilience, and high friction. Exemplary silicone materials include FDA approved food grade and human safe silicone materials.

The flexibility and resilience of the gasket allows easy removal, cleaning and replacement of the gasket over the flange. If the gasket wears out before the food pan does, or if it is desired to change the color of the flange for artistic or esthetic reasons, the gasket can be easily removed and replaced with another gasket.

The gasket will advantageously have a thickness that provides good thermal insulation and mechanical cushioning, without becoming too flimsy. According to one exemplary embodiment, the gasket has a main cross-sectional thickness across a major portion of the gasket (exclusive of beveled ends) of 1.5 mm. The gasket preferably has a thickness in a range of about 0.5 mm to about 3 mm, more preferably in a range of about 1 mm to about 2 mm, and most preferably about 1.5 mm.

The gasket can have a color that exactly matches or substantially blends with the paint or non-stick coating of the pan so that it is virtually unnoticeable. Alternatively, it can have one or more complementary and/or contrasting colors to provide decorative appeal. In the case of elastomer or other flexible materials, the protective gasket can provide shock resistance when the flange of the pan impacts metal or other hard objects, thereby increasing its useful lifespan. It may also facilitate replacement of an older protective gasket with a new one. Elastomeric protective gaskets provide greater finger gripping friction and a better seal between the flange and serving table countertop compared to harder and/or less resilient materials.

As discussed above, the protective gasket over the flange serves various functions. It proves an insulating heat barrier over the flange, which greatly slows heat transfer through the flange. This permits hot steamy food items to be transported to and from a serving table in the pan while protecting the fingers of restaurant workers from heat. In many cases, no hot pads or gloves are necessary to prevent burns, or at least thinner protective gloves may be used. The gasket increases tactile feel, grip and control of the pan, thereby reducing the risk of dropping the pan by the restaurant worker.

The protective gasket provides a seal between the food pan and the countertop of the serving table. Providing a better seal between the countertop and pan improves the retention of heat and cold within the interior portion of the serving table. It also helps prevent seepage of liquid materials under the flange and into the interior portion of the serving table, thereby increasing the cleanliness of the serving table. This reduces time and effort that must otherwise be spent in cleaning the interior of the serving table to maintain sanitary conditions.

The gasket also provides an insulating barrier between the food pan and countertop. In some cases, the countertop may be substantially hotter or cooler than the food pan. Direct contact between the flange of the food pan and countertop might provide a thermal bridge through which heat or cold can readily flow to or from the pan. Such flow might alter the desired temperature of the pan and compromise the ability of the pan to effectively heat or chill the food contained therein within a desired or legally mandated temperature range. The gasket provides high thermal insulation that permits the food pan and countertop to have greatly varying temperatures without promoting thermal flow therebetween. This helps maintain the food pan and food contained therein at a desired temperature, while decreasing the amount of energy required to maintain the food pan at the desired temperature.

In the case where the metal pans include a coating material, the protective gasket provides the additional benefit of protecting the coating material on the flange from chipping or wearing off. A chipped or worn flange can greatly detract from the visual appeal of the pan. People do not wish to ingest foreign materials, and a chipped or worn flange may give the impression that the pan is old, unclean or otherwise unsuitable for serving food, thereby greatly diminishing the restaurant's customer appeal. The protective coating over the flange prevents chipping or wear of the underlying paint or non-stick coating on the metal pan and/or it can be used to hide such chipping or wear if already present. This greatly enhances the visual appeal and longevity of a metal pan having a paint or non-stick coating that might otherwise have to be replaced due to a chipped or worn appearance.

Even if the flange is not painted or coated, the gasket can provide protection to relatively soft metals, such as aluminum, or brittle materials, such as ceramic, which might otherwise become pitted, scratched or chipped by blunt forces. This helps preserve the shape and integrity of the flange when made from soft metals.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pan for use in serving food therein, comprising:
    a body comprised of a high heat conductive material and including a wall that defines a hollow interior within which food can be held, said body having a closed lower end and an open upper end;
    a flange made of a high heat conductive material and projecting laterally from and extending around an outer surface of said wall at or near said upper end of said body, said flange having an upper surface, a lower surface, and an outer edge between the upper and lower surfaces; and
    a sealing and protective gasket comprised of a heat resistant, insulating and elastomeric material extending over said flange so as to entirely cover said outer edge and so as to cover all or a majority of said upper surface of said flange and all or a majority of said lower surface of said flange.

2. A pan as in claim 1, said body comprising at least one of stainless steel, aluminum or ceramic and said gasket comprising silicone rubber.

3. A pan as in claim 1, said flange and said gasket having a cross section that is circular, oval, rectangular, or rectangular with rounded corners.

4. A pan as in claim 1, said gasket covering a majority but not all of said upper surface of said flange.

5. A pan as in claim 4, said gasket covering more than about 70% of said lower surface of said flange.

6. A pan as in claim 4, said gasket covering more than about 80% of said lower surface of said flange.

7. A pan as in claim 1, said gasket covering more than about 90% of said lower surface of said flange.

8. A pan as in claim 4, said gasket covering essentially all of said lower surface of said flange.

9. A pan as in claim 8, said gasket terminating at or shy of said wall of said body so as to not curve around and cover an outer surface of said wall beyond a thickness of said gasket.

10. A pan as in claim 1, said gasket being immediately adjacent to and in direct contact with said lower surface of said flange so that the pan is substantially free of gaps between said gasket and said lower surface of said flange.

11. A pan as in claim 1, said gasket being immediately adjacent to and in direct contact with said upper surface of said flange so that the pan is substantially free of gaps between said gasket and said upper surface of said flange.

12. A pan as in claim 1, said gasket providing a gap width between said gasket and said flange that is less than about 20% of the gasket thickness.

13. A pan as in claim 12, wherein the gap width is less than about 15% of the gasket thickness.

14. A pan as in claim 12, wherein the gap width is less than about 10% of the gasket thickness.

15. A pan as in claim 12, wherein the gap width is less than about 5% of the gasket thickness.

16. A pan as in claim 1, further comprising a layer of at least one of paint, powder coat, anodizing, or non stick coating material on a surface of said body and said flange, said gasket protecting said layer wearing or chipping off of said flange.

17. A method of manufacturing a pan according to claim 1, comprising:
providing said body having said flange; and
attaching said gasket over said flange so that said gasket entirely covers said outer edge and covers all or a majority of said upper and lower surfaces of said flange and so that said flange is removeably attached to said flange.

18. A method as in claim 17, further comprising:
removing said gasket when worn, damaged or aged and replacing it with a new gasket comprised of a heat resistant, insulating and elastomeric material.

19. A pan apparatus for serving hot or cold food while maintaining said hot or cold food at a desired temperature, comprising:
one or more pans according to claim 1; and
a serving table for holding said one or more pans in a desired orientation during use, said serving table including a countertop having one or more recesses therethrough for receiving said one or more pans therethrough and so that at least a portion of said flange and said gasket flange extend over a portion of said countertop during use, said gasket forming a seal against said countertop.

20. A pan for use in serving food therein, comprising:
a body comprised of a high heat conductive metal and including a wall that defines a hollow interior within which food can be held, said body having a closed lower end and an open upper end;
a flange projecting laterally from and extending around an outer surface of said wall at or near said upper end of said body, said flange having an upper surface, a lower surface, and an outer edge between the upper and lower surfaces; and
a sealing and protective gasket comprised of a heat resistant, insulating and elastomeric material extending around said flange so as to entirely cover said outer edge and at least partially cover said upper and lower surfaces of said flange in order to provide a seal between said lower surface of said flange and an upper surface of a rim of a serving table when placed therein, said gasket being immediately adjacent to and in direct contact with said upper and lower surfaces of said flange, so that the pan is substantially free of gaps between said gasket and said upper and lower surfaces of said flange.

21. A pan gasket for placement over and sealing against a flange of a metal pan, comprising:
a gasket body made from a heat resistant, insulating and elastomeric material,
said gasket body having a size and shape so as to releasably fit over a flange of a pan that is rectangular or rectangular with rounded corners,
said gasket body having an upper portion that extends over and covers at least a majority of an upper surface of a flange that is rectangular or rectangular with rounded corners during use,
said gasket body having a lower portion that extends over and covers at least a majority of a lower surface of a flange that is rectangular or rectangular with rounded corners during use.

22. A pan gasket as in claim 21, said gasket body having a size and shape so as to be positionable immediately adjacent to and in direct contact with upper and lower surfaces of a flange that is rectangular or rectangular with rounded corners during use so as to be substantially free of gaps between said gasket body and upper and lower surfaces of the flange during use.

23. A kit of pan gaskets comprising
a first gasket according to claim 21; and
a second gasket comprising a second gasket body made from a heat resistant, insulating and elastomeric material and having a size and/or shape that is different than the size and/or shape of the first gasket so as to releasably fit over a flange of a pan having a different size and/or shape.

24. A kit of pan gaskets as in claim 23, wherein said second gasket body has a size and shape so as to fit over a flange of a pan having a round or oval cross section.

\* \* \* \* \*